United States Patent
Brantley

(10) Patent No.: US 10,176,693 B2
(45) Date of Patent: Jan. 8, 2019

(54) SECURITY AND TRACKING SYSTEMS AND RELATED METHODS

(71) Applicant: Leola Brantley, Rochester, NY (US)

(72) Inventor: Leola Brantley, Rochester, NY (US)

( * ) Notice: Subject to any disclaimer, the term of this patent is extended or adjusted under 35 U.S.C. 154(b) by 0 days.

(21) Appl. No.: 15/845,078

(22) Filed: Dec. 18, 2017

(65) Prior Publication Data

US 2018/0122202 A1 May 3, 2018

Related U.S. Application Data

(63) Continuation-in-part of application No. 15/330,266, filed on Nov. 17, 2006, now abandoned.

(60) Provisional application No. 62/388,721, filed on Feb. 5, 2016.

(51) Int. Cl.
| | |
|---|---|
| *A44C 7/00* | (2006.01) |
| *H04W 4/02* | (2018.01) |
| *G08B 13/24* | (2006.01) |
| *G08B 21/02* | (2006.01) |
| *G08B 25/01* | (2006.01) |

(52) U.S. Cl.
CPC .......... *G08B 21/0275* (2013.01); *A44C 7/003* (2013.01); *G08B 13/248* (2013.01); *G08B 13/2417* (2013.01); *G08B 13/2445* (2013.01); *G08B 13/2462* (2013.01); *G08B 25/016* (2013.01); *H04W 4/02* (2013.01)

(58) Field of Classification Search
CPC ............ G08B 21/0269; G08B 21/0275; G08B 21/0202; G08B 21/0205; G08B 21/028; G08B 21/0288; G08B 21/0291; G08B 13/2445; G08B 25/016; G08B 21/0294; A41D 1/002

See application file for complete search history.

(56) References Cited

U.S. PATENT DOCUMENTS

| | | |
|---|---|---|
| 6,278,370 B1 | 8/2001 | Underwood |
| 6,388,612 B1 | 5/2002 | Neher |
| 7,164,354 B1 * | 1/2007 | Panzer ................ G07C 9/00111 235/384 |

(Continued)

FOREIGN PATENT DOCUMENTS

| | | | |
|---|---|---|---|
| JP | 2013-162277 | | 8/2013 |
| JP | 2013162277 A | * | 8/2013 |
| KR | 2016077829 A | * | 7/2016 |

*Primary Examiner* — John Villecco
(74) *Attorney, Agent, or Firm* — Law Office of Paul B. Johnson; Paul Johnson

(57) ABSTRACT

Security and tracking systems disclosed herein include a server coupled with a database, a computing device coupled with the database and including a display, and a wearable recording device (device) configured to record audio and video, the device having an identifier associated with the user through the database. One or more user interfaces are displayed on the display and include one or more inputs configured to associate the identifier with the user through the database. The wearable recording device may be an earring. Some security and tracking systems include a tracking device (tracker) having at least one sharp end, the tracker configured to be insertable into a hem or fold of a clothing item, the tracker having an identifier associated with the user through the database using inputs on one or more user interfaces displayed on the display, the tracker including a visual display of the identifier.

8 Claims, 6 Drawing Sheets

(56) References Cited

U.S. PATENT DOCUMENTS

| | | | |
|---|---|---|---|
| 7,845,569 B1* | 12/2010 | Warther | G06K 19/04 235/375 |
| 8,676,274 B2* | 3/2014 | Li | H04M 19/04 340/384.6 |
| 8,957,774 B2 | 2/2015 | Goldblatt | |
| 8,981,924 B2* | 3/2015 | Yaqub | G08B 13/1427 235/375 |
| 9,041,812 B2* | 5/2015 | Billau | G08B 13/19682 348/143 |
| 9,092,963 B2* | 7/2015 | Fetzer | G08B 21/0261 |
| 9,361,782 B2* | 6/2016 | Lin | G08B 13/1427 |
| 9,361,783 B2* | 6/2016 | Harvey | G08B 25/016 |
| 9,679,456 B2* | 6/2017 | East | G08B 13/2462 |
| 2003/0034887 A1* | 2/2003 | Crabtree | G01S 3/54 340/539.1 |
| 2004/0198382 A1 | 10/2004 | Wong | |
| 2007/0210924 A1* | 9/2007 | Arnold | B31D 1/021 340/572.8 |
| 2007/0229350 A1 | 10/2007 | Scalisi et al. | |
| 2008/0214142 A1* | 9/2008 | Morin | G08B 25/016 455/404.2 |
| 2008/0231447 A1* | 9/2008 | Grossman | G01S 11/06 340/572.1 |
| 2010/0060459 A1* | 3/2010 | Stole | G06K 19/07724 340/572.8 |
| 2011/0133904 A1* | 6/2011 | Warther | G06K 19/04 340/10.5 |
| 2011/0234397 A1* | 9/2011 | Fetzer | G08B 21/0261 340/539.13 |
| 2011/0300905 A1* | 12/2011 | Levi | G08B 13/1427 455/557 |
| 2012/0050048 A1 | 3/2012 | Sandra et al. | |
| 2012/0052922 A1 | 3/2012 | Li | |
| 2013/0015971 A1* | 1/2013 | Caporizzo | G08B 13/1427 340/539.32 |
| 2013/0234853 A1* | 9/2013 | Kazerouni | G08B 13/1427 340/572.1 |
| 2014/0118149 A1 | 5/2014 | Elias | |
| 2014/0221016 A1* | 8/2014 | Lee et al. | G08B 21/0269 455/456.3 |
| 2015/0009027 A1 | 1/2015 | Harvey | |
| 2015/0029024 A1* | 1/2015 | Outwater | G08B 21/18 340/539.13 |
| 2015/0070165 A1* | 3/2015 | East | G08B 13/2462 340/539.13 |
| 2015/0133170 A1* | 5/2015 | Buchheim | H04W 4/023 455/456.5 |
| 2015/0281882 A1 | 10/2015 | Tomaszewski, Sr. | |
| 2015/0356861 A1* | 12/2015 | Daoura | G08B 21/0269 340/539.13 |
| 2015/0356862 A1* | 12/2015 | Daoura | G08B 25/10 340/686.6 |
| 2015/0373521 A1* | 12/2015 | Olesen | H04W 4/90 455/404.2 |
| 2016/0105406 A1* | 4/2016 | Smith | H04W 76/14 713/171 |
| 2016/0106177 A1 | 4/2016 | De Laurentis | |
| 2016/0286877 A1 | 10/2016 | Thierry | |
| 2016/0291162 A1* | 10/2016 | Larkins | A41D 1/002 |
| 2017/0064511 A1* | 3/2017 | McCormick | H04W 4/025 |
| 2017/0132899 A1 | 5/2017 | Theocharous | |
| 2017/0185102 A1 | 6/2017 | Yong et al. | |
| 2017/0270401 A1* | 9/2017 | Kato | G06K 19/077 |
| 2018/0067200 A1* | 3/2018 | Cook | G01S 5/0018 |

\* cited by examiner

SECURITY AND TRACKING SYSTEMS AND RELATED METHODS

CROSS REFERENCE TO RELATED APPLICATIONS

This document is a continuation in part application of U.S. Nonprovisional Utility application Ser. No. 15/330,266, entitled "Detector slide and traceable camera and recording," naming as first inventor Leola Brantley, which was filed on Nov. 17, 2016, now pending, which in turn claims the benefit of the filing date of U.S. Provisional Patent Application No. 62/388,721, entitled "Party guards—the dummy and body tracker and switch ups," naming as first inventor Leola Charles, which was filed on Feb. 5, 2016, now expired, the disclosures of each of which are hereby incorporated entirely herein by reference.

BACKGROUND

1. Technical Field

Aspects of this document relate generally to devices, software applications, and systems for providing security and tracking.

2. Background Art

There are software systems and methods in the art for providing security. For example, security cameras are used on premises to deter thieves from breaking and entering. There also exist in the art devices and methods for tracking stolen items, for example some vehicles are equipped with devices to allow tracking of the vehicle if stolen.

SUMMARY

Embodiments of security and tracking systems (systems) may include: a server communicatively coupled with a database; a computing device communicatively coupled with the database through a telecommunication network, the computing device including a display; a tracking device (tracker) having a sharp end, the tracker configured to be insertable into one of a hem and a fold of a clothing item, the tracker having an identifier associated with a user through the database; a wearable recording device configured to record audio and video, the wearable recording device having an identifier associated with the user through the database, and; one or more user interfaces displayed on the display, the one or more user interfaces having one or more inputs configured to associate the identifier of the tracker with the user through the database and to associate the identifier of the wearable recording device with the user through the database.

Embodiments of security and tracking systems (systems) may include one or more or all of the following:

The tracker may include a passive identification tag.

The wearable recording device may include a power switch.

The wearable recording device may include an electrical connector configured to transfer recorded audio and video to a second computing device.

The wearable recording device may include an earring.

An earring post of the earring may include the electrical connector.

The tracker may include a visual display of the identifier of the tracker.

The system may include an adapter having a first electrical connector configured to physically and electrically couple with the electrical connector of the wearable recording device, the adapter also having a second electrical connector configured to physically and electrically couple with a second computing device to allow downloading of recorded audio and video from the wearable recording device to the second computing device.

Embodiments of security and tracking systems (systems) may include: a server communicatively coupled with a database; a computing device communicatively coupled with the database through a telecommunication network, the computing device including a display, and; an earring configured to record audio and video, the earring including an identifier associated with the user through the database, and; one or more user interfaces displayed on the display, the one or more user interfaces having one or more inputs configured to associate the identifier with the user through the database.

Embodiments of security and tracking systems (systems) may include one or more or all of the following:

The earring may include a power switch.

The earring may include an electrical connector configured to transfer recorded audio and video to a second computing device.

The electrical connector may be integrally formed with an earring post of the earring.

The system may include an adapter having a first electrical connector configured to physically and electrically couple with the electrical connector of the earring, the adapter also having a second electrical connector configured to physically and electrically couple with a second computing device to allow downloading of recorded audio and video from the earring to the second computing device.

The system may include a second computing device communicatively coupled with the database through the telecommunication network, wherein one or more user interfaces displayed on a display of the second computing device include one or more inputs configured to allow a second user to play, on the second computing device, live audio and video recorded by the earring.

A second computing device may be communicatively coupled with the database through the telecommunication network, wherein one or more user interfaces displayed on a display of the second computing device include one or more inputs configured to allow a second user to remotely initiate recording of audio and video by the earring.

The earring may include a global positioning system (GPS) chip.

Embodiments of security and tracking systems (systems) may include: a server communicatively coupled with a database; a computing device communicatively coupled with the database through a telecommunication network, the computing device including a display, and; a tracking device (tracker) having at least one sharp end, the tracker configured to be insertable into one of a hem and a fold of a clothing item, the tracker including a visual display of an identifier, the identifier associated with a user through the database using one or more inputs on one or more user interfaces displayed on the display.

Embodiments of security and tracking systems (systems) may include one or more or all of the following:

The tracker may include a passive identification tag.

The tracker may consist of a passive identification tag coupled within a flexible polymer strip forming the at least one sharp end and having the visual display located on an outer surface of the flexible polymer strip.

The tracker may include a flexible material formed into an elongated hexagon and the at least one sharp end may include two sharp ends formed by the elongated hexagon.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Implementations/embodiments disclosed herein (including those not expressly discussed in detail) are not limited to the particular components or procedures described herein. Additional or alternative components, assembly procedures, and/or methods of use consistent with the intended security and tracking systems and related methods may be utilized in any implementation. This may include any materials, components, sub-components, methods, sub-methods, steps, and so forth.

Figure 1:
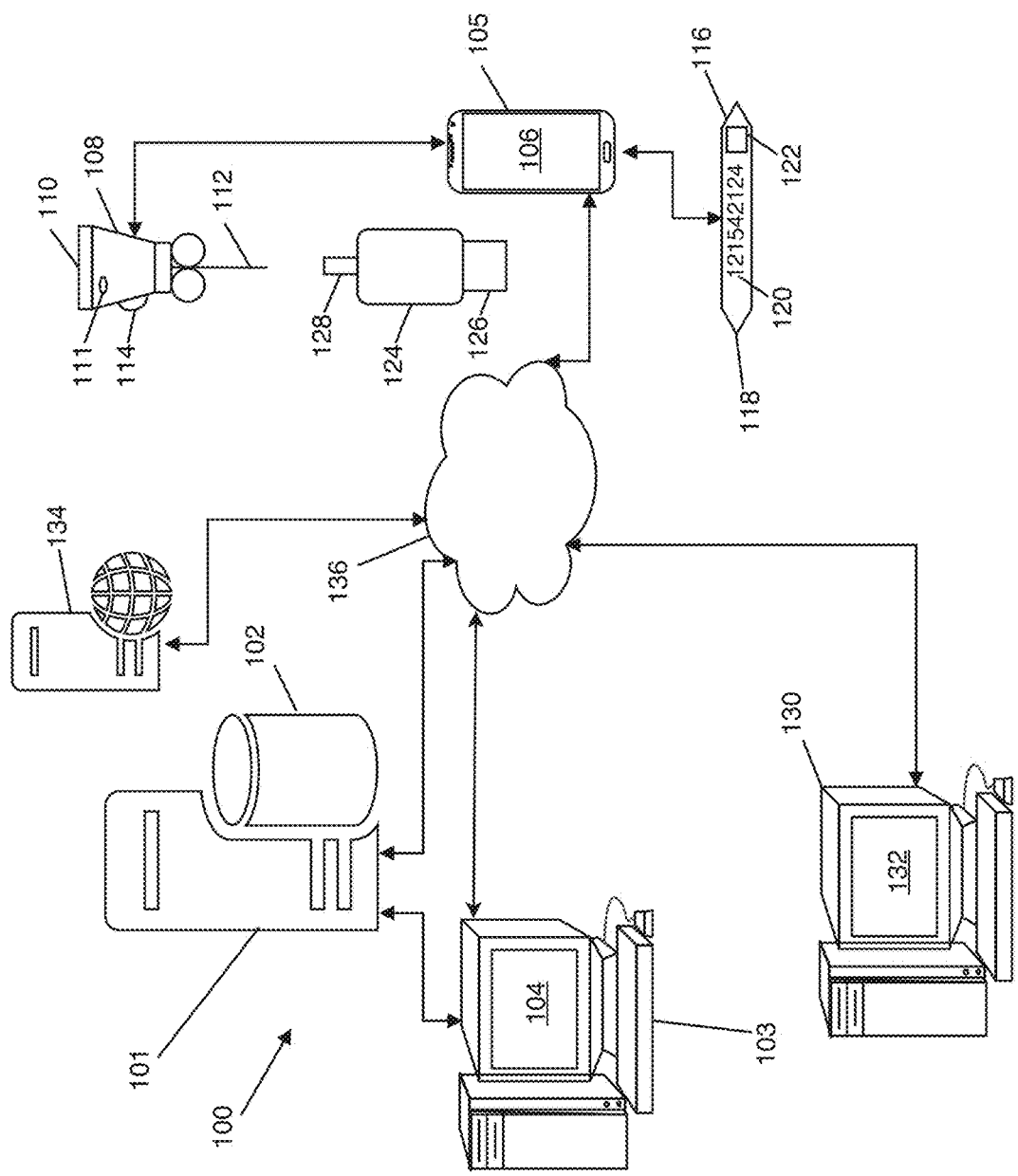
FIG. 1 is a block diagram of components of an implementation of a security and tracking system (system) (elements are not shown to scale)

Referring to FIG. 1, an implementation of a security and tracking system (system) 100 is representatively illustrated. The representative example system includes a server 101 coupled with a database 102. The server and database could be integrally formed, for instance a database located within memory of the server, or the two could be communicatively coupled through a telecommunication network or the like. A computing device (device) 103 is communicatively coupled with the server either directly or through a telecommunication network and includes a display 104. Computing device 103 could be a desktop computer, laptop, mobile device (such as a smart phone), a tablet, and so forth. In the implementation shown it is a desktop computer and is shown as an element distinct to the server and database. In other implementations computing device 103 and the server and database could all be included in a single machine or computing device. In still other implementations one or more servers, databases, etc. could be implemented using multiple virtual servers on a single machine or computing device or server.

Computing device 103 is an administrator controlled computing device, and may include one or more user interfaces displayed on the display 104 allowing the administrator to set up or vary certain features of the system. For example, from the computing device 103 an administrator may configure the user interfaces and options that will be available to users of the system, may configure and set up input fields displayed on user interfaces to be stored in and retrieved from the database using the server, and so forth. Other configuring mechanisms/methods may be implemented by an administrator using the computing device 103. An administrator could also access the system using telecommunication network 136, such as by accessing a website through a web server 134 which is communicatively coupled with the server 101 through the telecommunication network (though this coupling in implementations could be a wired or local wireless coupling). Other non-admin users of the system may also access the database and server through the web server, such as through a website. The telecommunication network may be, by non-limiting example, the Internet.

A computing device 105 is shown, represented here as a mobile telephone or smart phone having a display 106. Computing device 105 is communicatively coupled with the server and database through the telecommunication network and is a computing device of an end user of the system. The end user uses the system to secure the user himself/herself and/or to secure one or more items of property of the end user. The display 106 of device 105 is used to display one or more user interfaces through which the user can configure settings of the system, associate items with the user through the database, send messages, store video and audio, and the like.

For example, FIG. 1 also shows a wearable recording device (device) 108 which is communicatively coupled with device 105 and is configured to capture and record audio and video. Device 108 is shown as an earring, though in other implementations it could be implemented in other items, such as in a pair of glasses, in a pin or button coupled with a shirt or jacket of the user, and so forth, and all of the elements described herein that are included in the earring version could be included in those other versions. In the implementation shown the earring includes a video input 110, which is a camera, an audio input 111, which is a microphone, a power switch (switch) 114 (implemented here as a push button though it could alternatively be a sliding switch or a touch sensor), and an electrical connector 112. The electrical connector is integrally formed with an earring post of the earring. The earring in this implementation also includes, in implementations, though not shown in the drawings, one or more memory elements attached to the earring for storing the recorded audio/video, one or more power supplies such as a rechargeable battery for powering the device, one or more wireless communication chips or components such as for sending and/or receiving short or long range radio signals (such as BLUETOOTH or otherwise), and/or one or more global positioning system (GPS) chips and/or components for GPS positioning functions.

As described, the earring may be configured to wirelessly transmit data. In such implementations the earring may communicate data to the communicatively coupled device 105 which may in turn upload the recorded audio and video to the database (or to a separate database) for later viewing by this user or another user (such as a friend or family member of the user who has received a password from the user), or by law enforcement, or for live streaming video and audio such as viewed by a family member, friend, law enforcement member, or the like, in either case (live or later watched) viewable at a website using the web server coupled with the database. The recorded video/audio may also be viewed by one or more users through a software application installed on a mobile device which may, in implementations, access the database through the telecommunication network without using the web server.

The earring post as described above may also include or be integrally formed with an electrical connector for the transferring of store audio/video to another device. In implementations the electrical connector may also be used to recharge a battery attached to the earring or internal to the earring (though in other implementations the earring may be charged wirelessly such as through inductive charging or a similar technology). The system may include an adapter 124 which is used to communicatively couple the earring with another computing device. By non-limiting example, the adapter includes an electrical connector 128 configured to physically and electrically couple with electrical connector 112 and also includes an electrical connector 126 which in this case is representatively shown as a Universal Serial Bus (USB) connector, so that the earring may be physically and electrically coupled with a computing device (such as a desktop computer, a laptop, a tablet, etc.) for downloading the recorded audio/video to that device (which may then be uploaded to the database such as through the aforementioned app or web server using a website). In other implementations the adapter may be excluded from the system and the earring may include an electrical connector that is connectable to a mobile device using an electrical connector type now in use or hereafter discovered/implemented. The use of a USB connector is only given here as a representative example, and when an adapter is included in the system any type of electrical connector now in use or hereafter discovered/implemented could be included.

The audio and video recording features of the earring may be useful as security mechanisms, such as to record an assailant, record a crime, and so forth. The user may be able to initiate recording of audio or video through audio commands, through an input on a user interface displayed on display 106, and the like. In some implementations the system may be configured to automatically begin recording in certain situations, such as if the wearer of the earring begins to scream or run or the like (or says a code word or phrase like "leave me alone" or "record" or the like), and in such implementations the audio input of the earring and/or audio and/or motion sensors of the device 105 may be utilized to implement such recording. The positioning of a camera on the end of an earring may in implementations be useful to record an assailant because persons being attacked often raise hands/arms to ward off an attacker and/or turn to the side, but the camera on the earring in implementations may still be able to capture audio and video of the attacker. Although the term attacker is used herein, it is to be understood that the assailant may be a thief who means no physical harm to the victim but intends to commit larceny, robbery, burglary, etc. The use of a GPS chip in the earring may be useful to track a position of the wearer in case a crime is committed by a third party and the user is taken to an unknown location.

FIG. 1 also shows a tracking device (tracker) 116 communicatively coupled with the device 105 and having a sharp end 118 and an identifier 120 visually displayed on the tracker. The tracker in implementations includes a passive radio-frequency identification (RFID) tag 122 and is formed of a flexible material, such as a flexible polymer strip. The identifier is shown visually displayed on an outer surface of the flexible polymer strip. The representative example shows the strip as formed into the shape of an elongated hexagon having two sharp ends. The sharp ends are used to penetrate an item of clothing or other material in order to ensconce the tracker inside some item. By non-limiting example, the tracker could penetrate into a hem or a fold of an item of clothing, or could be placed within a hem or fold of a purse, could be placed within material of an item of furniture, and the like. In either case, although the tracker may be placed in a variety of items, the sharp nature of the ends of the tracker means that it is "configured to" be placed within a clothing item by penetrating into a hem or fold of the garment. The sharp nature of the ends of the tracker allow it to slip threads apart in order to slide through, or sever some threads in order to slide into a hem or fold, etc. Using a similar mechanism the tracker may be placed into any item formed of cloth or otherwise penetrable material. The tracker could alternatively be placed in a drawer, in a car, in a computer, in a wallet, etc., in each case in a manner in which it is not easily detectable by a thief or third party. Due to its small size, its thin flat profile, and/or its ability to penetrate into small crevices or hems or folds, it may be easily hidden within or on an item and go undetected by a thief. In implementations the tracker consists entirely of a passive RFID tag coupled within or on a flexible polymer strip having the visual display of the identifier located on an outer surface of the flexible polymer strip, the flexible polymer strip having one or two sharp ends.

The identifier is representatively illustrated as a multiple digit number but it could be any alphanumeric code and/or could include any non-alphanumeric symbols. The identifier is associated with the tracker through the database. The user may associate the specific identifier of an individual tracker with the user (and/or with the user's device 105) through the database and/or with a specific named item (such as "coat," "purse," "car," etc.) through the database, using one or more interfaces displayed on display 106, which may assist in recovering items lost by or stolen from the user by being able to identify who the stolen or lost item belongs to. In implementations the tracker could include an active RFID tag or a GPS chip as well and could be powered through a rechargeable battery rechargeable using various means such as motion charging, photovoltaic (PV) charging, heat charging using photonic crystals which emit light to a PV unit in response to heat, or a plug-in charger or inductive charger or the like. One advantage of passive RFID (and passive solutions in general) is the ability to have the tracker useful for long periods of time (many years) without requiring any power. Alternatively the tracker could include an active or passive near-field communication (NFC) tag. As used herein, the term "passive identification tag" is defined as a tag that is generally unpowered but that is configured to receive an electromagnetic communication to power the tag and enable it to communicate a signal from the tag.

Although not shown in FIG. 1, the system may include other computing devices coupled with the database or server through the telecommunication network. By non-limiting example, as described above friends or family of the end user may have mobile devices or other computing devices coupled with the server, or law enforcement may have mobile devices or computing devices coupled with the server, and so forth, and these computing devices may form part of the system. Furthermore, only one end user is described above, but the system may in implementations include myriad end users, all having earrings and/or wearable devices and/or trackers coupled with the system through their individual computing devices, their individual computing devices (mobile phones or the like) also capable of locating lost or stolen items for other users, as described further below. Accordingly, the system may include any number of end user computing devices. A computing device 130 is also shown in FIG. 1, representatively illustrated as a desktop device having a display 132, though in other implementations it could be a laptop, tablet, mobile phone, etc. The computing device 130 is a representative illustration of a computing device of a family member or friend or other trusted associate of an end user, and may be used by the family member or friend or trusted associate to, for example, watch live video and hear live audio from the wearable recording device. This could be used by a parent to monitor a child, for example, on a date or in a social situation which could potentially be dangerous, understanding of course that the end user could turn off the wearable recording device at his/her choice if privacy is desired (but in some situations the end user may want a friend or family member or trusted associate to be able to keep an eye on them during some event or period of time). For example, if the end user is attending a party at which few persons are known, the end user may wish for a friend to have access to recorded video/audio to ensure the safety of the end user. Such access/permissions may be given for limited amounts of time or limited uses as desired by the end user.

FIGS. 2-6 are representative examples of user interfaces that may be displayed on displays of computing devices that are communicatively coupled with the server through the telecommunication network and form a part of the system of FIG. 1. Some of the user interfaces shown in FIGS. 2-6 could be shown on an end user computing device, some could be shown on a computing device of a friend or family member or trusted associate of an end user, some could be shown on a device of a law enforcement officer, some could be shown on all or some of these devices, and so forth. Although in each case the user interface is representatively illustrated on a mobile phone device, the computing devices in any of FIGS. 2-6 could alternatively be tablets, personal computers, desktop computers, laptops, smart watches, and so forth (any of the computing devices disclosed herein could be smart watches).

Figure 2:
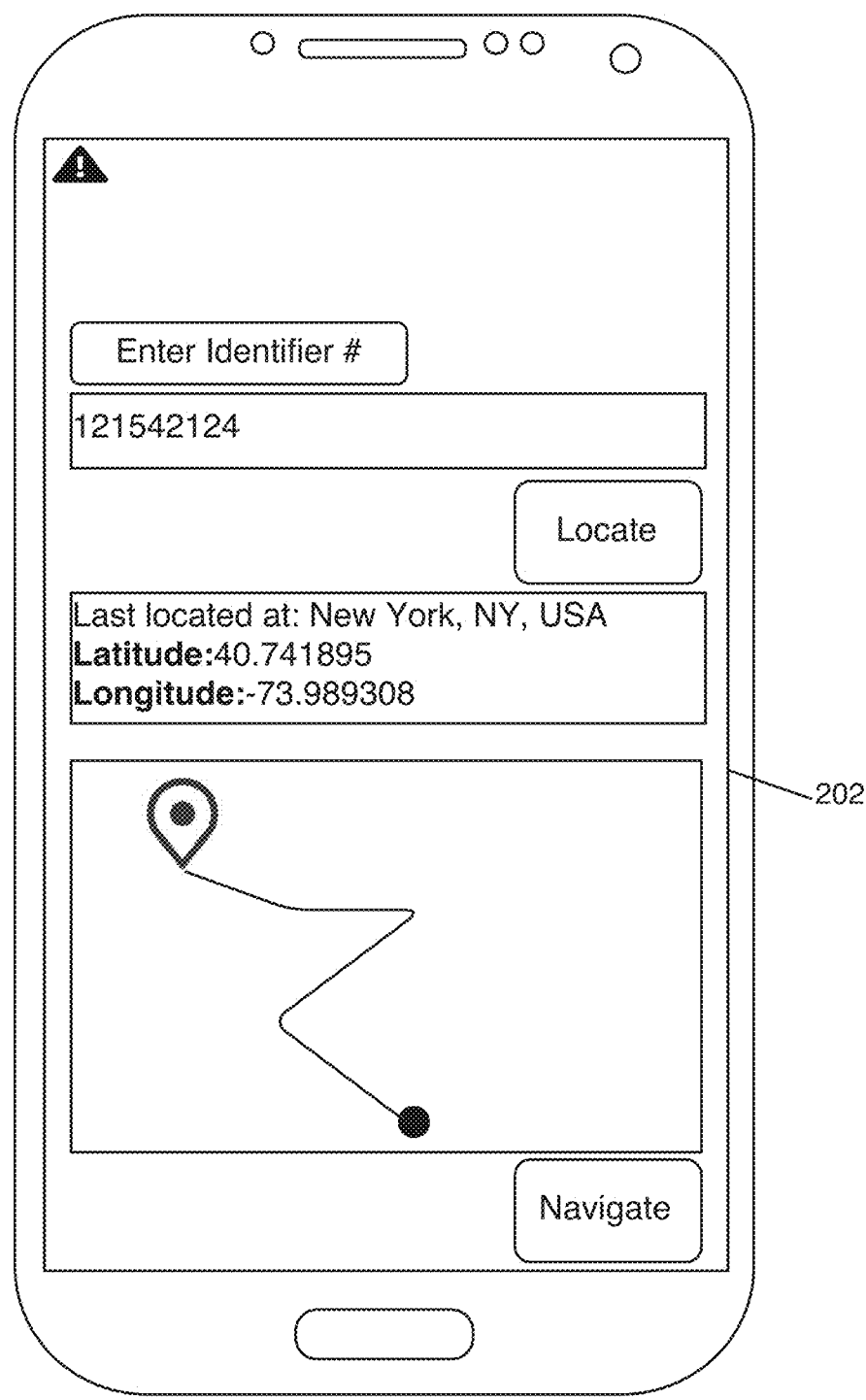
FIG. 2 is a front view of a user interface displayed on a display of a computing device of the system of FIG. 1.

Referring now to FIG. 2, a representative example of a user interface (UI) (interface) 202 is shown. This is a user interface displayed on a device of an end user (such as device 105) and is accessed through an app installed on the device. The app may have login credentials associated with the user through the database which the user may use to log into the app and/or to allow a friend or family member to access details of their account or other items/features through the app installed on the friend/family member device (the same for law enforcement). Interface 202 shows a notification indicator at the top left of the screen (shown here as an exclamation point within a triangle—though any visual and/or sound and/or tactile notification could be utilized—such as a vibration) to indicate a push notification sent to the user. In this case the push notification could be accessed by the user to bring up another user interface, shown in FIG. 5 and described in more detail later, but briefly here the notification is indicating to the user that a lost or stolen item of another user is nearby. This may be determined, for example, by the user's phone occasionally sending out signals to identify nearby trackers and, when a response signal is received from a nearby tacker 116 by the device, generating a notification at the end user's device. In other implementations the notification could be a push notification sent to the end user in response to the GPS position of the end user being within a certain radius of where a lost item was last identified (for example within 100 feet or a quarter mile of the last known position of a lost or missing item) as stored in the database and this may thus be a push notification sent from the server or web server to the device through the telecommunication network to the app installed on the device. The notification indicator is accordingly an input of interface 202 which in implementations pulls up interface 502.

FIG. 2 further shows an "Enter Identifier #" description below which is an input field in which a user may input an identifier number and select a "Locate" input to identify the last known location of the tracker associated with the identifier through the database. In the interface shown, once the end user does this the last known location is shown by giving the city and state and country, latitude and longitude (GPS coordinates), and a map showing navigation directions to the last known location. The last known location may be identified by determining the last location, stored in the database, at which a user device having the app installed received a signal from a passive identification tag of a tracker (the location having previously been sent by that user's device to the server for storage in the database and now retrieved from the database to send to this user's device). As also described above, the identification tags may be active and powered, and in such cases the tags may operate slightly differently in that the tag may be consistently sending out occasional signals to nearby computing devices, and when a user having the app installed comes within receiving distance a notification may be generated to that user and/or to the owner of the tracker.

It is to be understood that all elements of the trackers may, in implementations, equally apply to earrings or other wearable recording devices. For example, an earring or wearable recording device may also have an identifier, which may be visually displayed somewhere on the earring or wearable recording device, and the identifier may be associated with a user and/or device through the database using one or more interfaces displayed on a display of a computing device of an end user, and accordingly in implementations the earring or wearable recording device may perform all of the functions that are described herein for the trackers. The trackers, nevertheless, being in some cases passive identification tags formed of inexpensive materials, may be relatively less expensive than the wearable recording device, such that a user may have many trackers to be used for certain items (or for certain people—for example placing a tracker in the shoe of a small child while at a theme park, etc.), while the user may have only one or a few pairs of earrings or wearable recording devices.

In implementations the system may not send push notifications to nearby users who are not owners of the found item. This may dissuade thieves and the like from using the app and system to try to find lost items and retrieve them for themselves. In other implementations the system may send notifications to users that a lost item is nearby, even if the nearby user is not the owner of the device, but may use an algorithm or the like to determine if that user may have stolen the device (for example the item disappeared after that user passed nearby the lost item, or several items disappeared after that user passed nearby the lost items), in which case such a user could be identified to law enforcement and/or banned from the system. In other implementations the system may have certain trusted users, such as users who have in the past reliably returned lost items, and trusted users may receive notifications of particularly valuable items that have been located, while non-trusted users or users with lower reliability ratings (or no reliability ratings) may receive notifications only of nearby items that are less valuable until they have built up a reputation for returning items.

FIG. 2 shows a map displaying a route to the lost item and, below this, a "Navigate" input which, if selected, will begin a navigation to the lost item by walking, or by auto, or the like, which may be implemented through a third-party application such as a map software application installed on the device.

Figure 3:
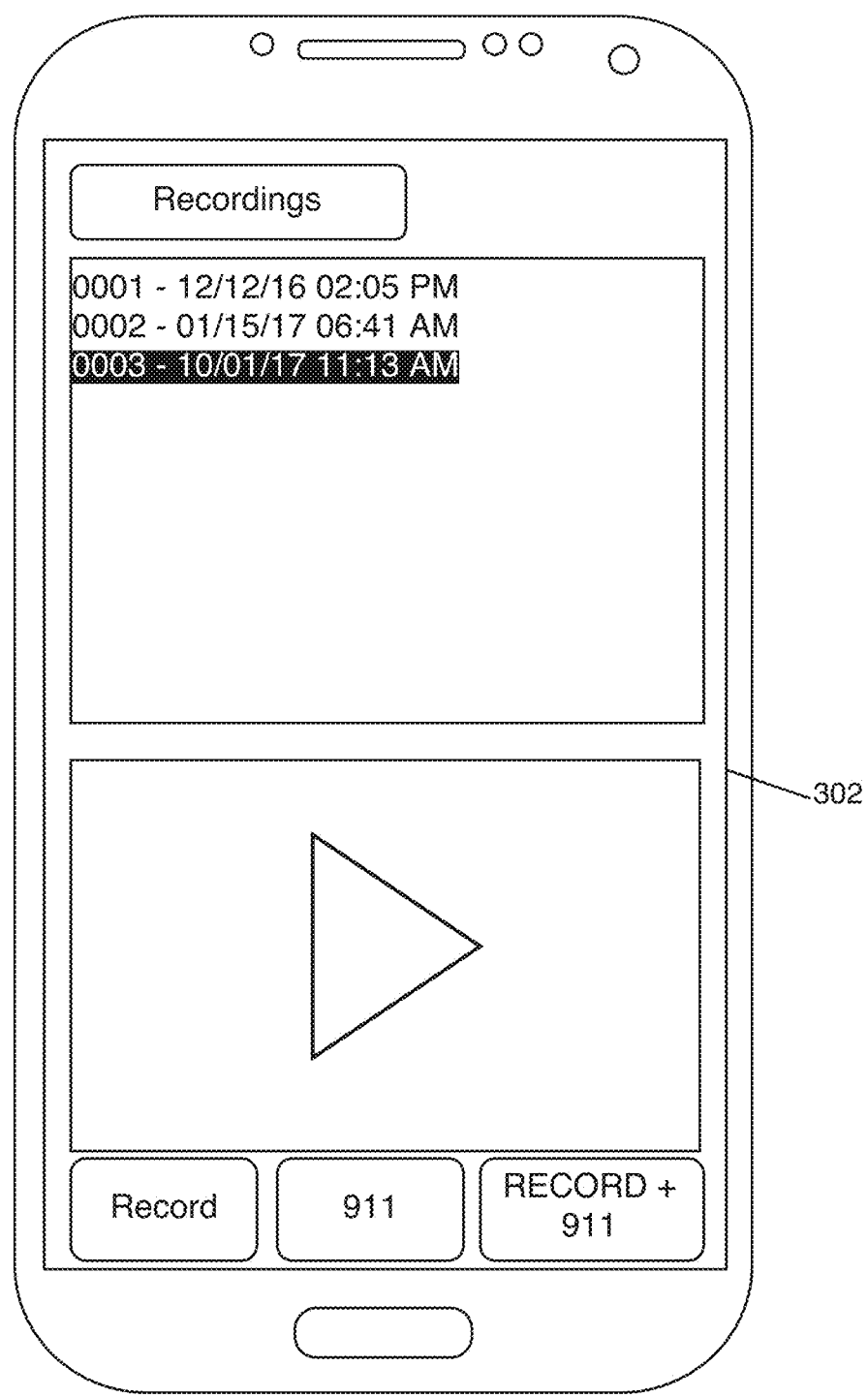
FIG. 3 is a front view of another user interface displayed on a display of a computing device of the system of FIG. 1.

FIG. 3 shows a user interface (UI) (interface) 302 shown on a device of an end user, such as device 105, and accessed through the aforementioned app. It includes a number of inputs related to the wearable recording device. At the top of the interface under the "Recordings" indicator is a list of recordings having names ("0001," "0002," etc. in this case) and dates and recording times, and these indicators are inputs which a user may touch-select (the last one on the list is highlighted as being selected), and below this a play button (right facing triangle) may be pressed to begin playing that video. This interface, accordingly, allows the end user to view and listen to past audio and video recordings recorded using the wearable recording device 108 and either downloaded to the device (wirelessly or using an adapter 124) or uploaded to the database (such as through a desktop computer) and streamed from the database to the device 105. Other inputs, not shown, may be used to delete or rename recordings, or to share them with another user such as through social media links, email, texting, other users of the aforementioned app, or share them with law enforcement or 911 operators, etc. Inputs at the bottom are representatively illustrated and show an input for beginning a new recording, for calling 911, or for beginning a new recording and calling 911 at the same time. Accordingly, when the left or right buttons are selected the earring(s) or other wearable recording device begin recording audio and video.

It may be understood that a user may use only one earring and not a pair and still record audio or video, that the earring may be worn by a male or female, that the earring in some implementations may be designed to record only audio or only video (or the user may select which is recorded), and so forth.

Figure 4:
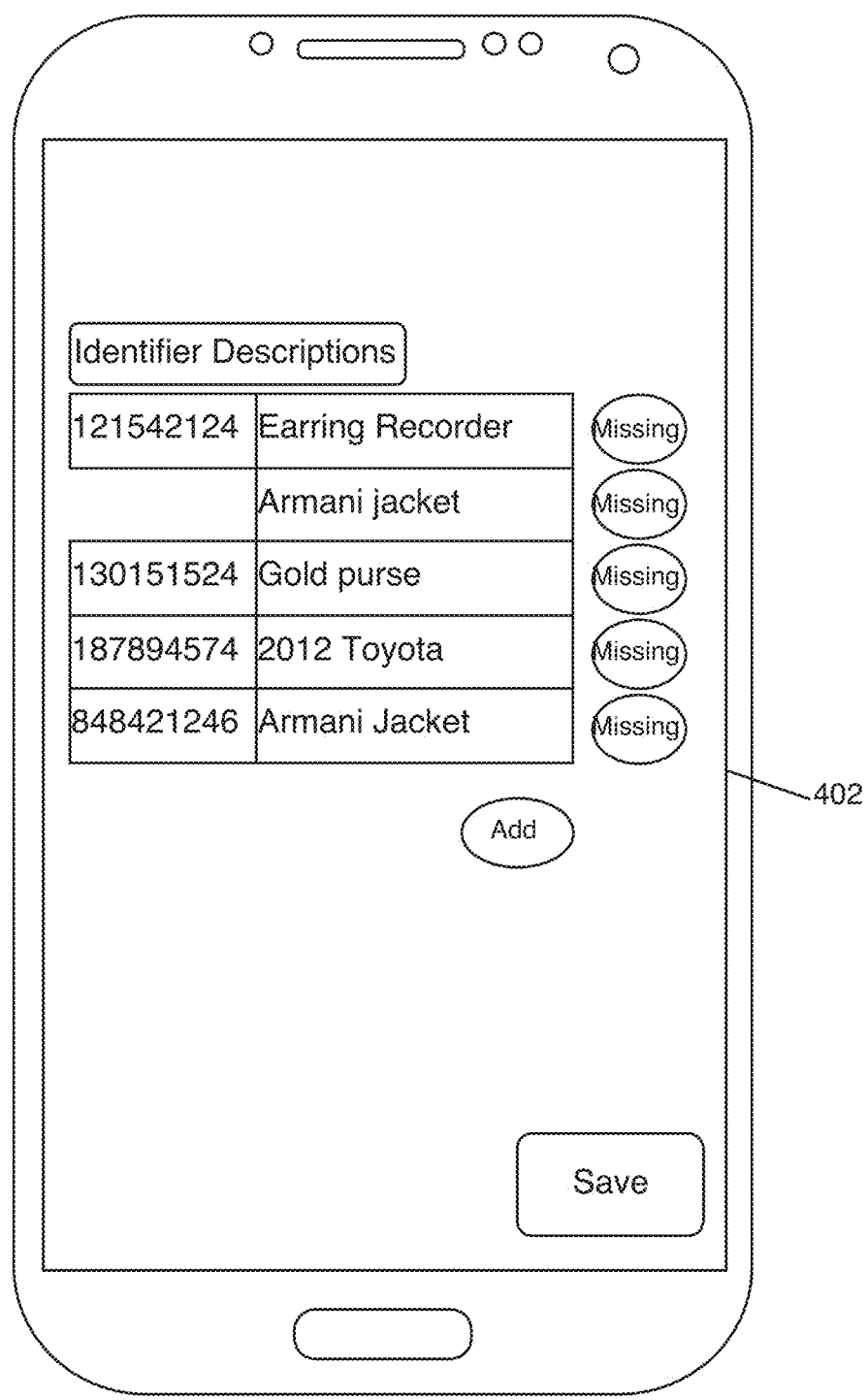
FIG. 4 is a front view of another user interface displayed on a display of a computing device of the system of FIG. 1.

FIG. 4 shows a representative example of a user interface (UI) (interface) 402 which is displayed on the end user device, such as device 105, through the app installed on the device. Through this interface the user may associate, through the database, certain trackers with the user and/or with certain items of property, or the like. Underneath the "Identifier Descriptions" are input fields in which a user may input an identifier alongside a description of the items to be associated with the identifier. In the topmost example it may be seen that one identifier is associated both with an earring recorder and with a jacket. In some implementations a set may be sold to an end user which includes one or two wearable recording devices, earring or otherwise (by non-limiting example for more security in case one is dislodged or stops operating or so that the effective recording time can be doubled by using one until the battery is discharged and then using the other), and one tracker, and both the wearable recording device and the tracker utilize the same identifier, so that through the database both the wearable recording device and one other item (in which the tracker is placed or to which the tracker is attached) are associated with that identifier and with the user through the database. In some implementations this screen may auto-populate the identifiers, which may have been associated with the user account at the point of purchase, and the user on this screen only inputs descriptions or edits descriptions in the description fields. In other implementations the user may manually input identifiers and descriptions. In implementations the description of the wearable recording device could be edited (such as "vehicle" if the wearable recording device is hidden in a vehicle—in that case the end user or law enforcement or a family member or friend may be able to remotely activate audio and/or video recording of the wearable recording device if the vehicle is stolen through another user interface of the app, not shown in the drawings). A description could be a child's name like "Johnny" if the tracker is located with a child such as in or on a clothing item of the child. An "Add" input is shown which may be used to populate new empty fields for manually inputting a new identifier number for a new tracker or wearable recording device and for inputting a description, and when the "Save" input is selected a signal is sent to the database through the telecommunication network to store the association in the database, thus the identifiers and their descriptions are associated with the user or with the specific device 105 (they could be associated with the user's telephone number, or input account information, etc., and so forth) through the database. Also shown are inputs for reporting a device as missing, which if selected will transmit a signal to the database server to store the missing indication in the database, which may trigger some of the notifications and features previously discussed with respect to other user interfaces.

Figure 5:
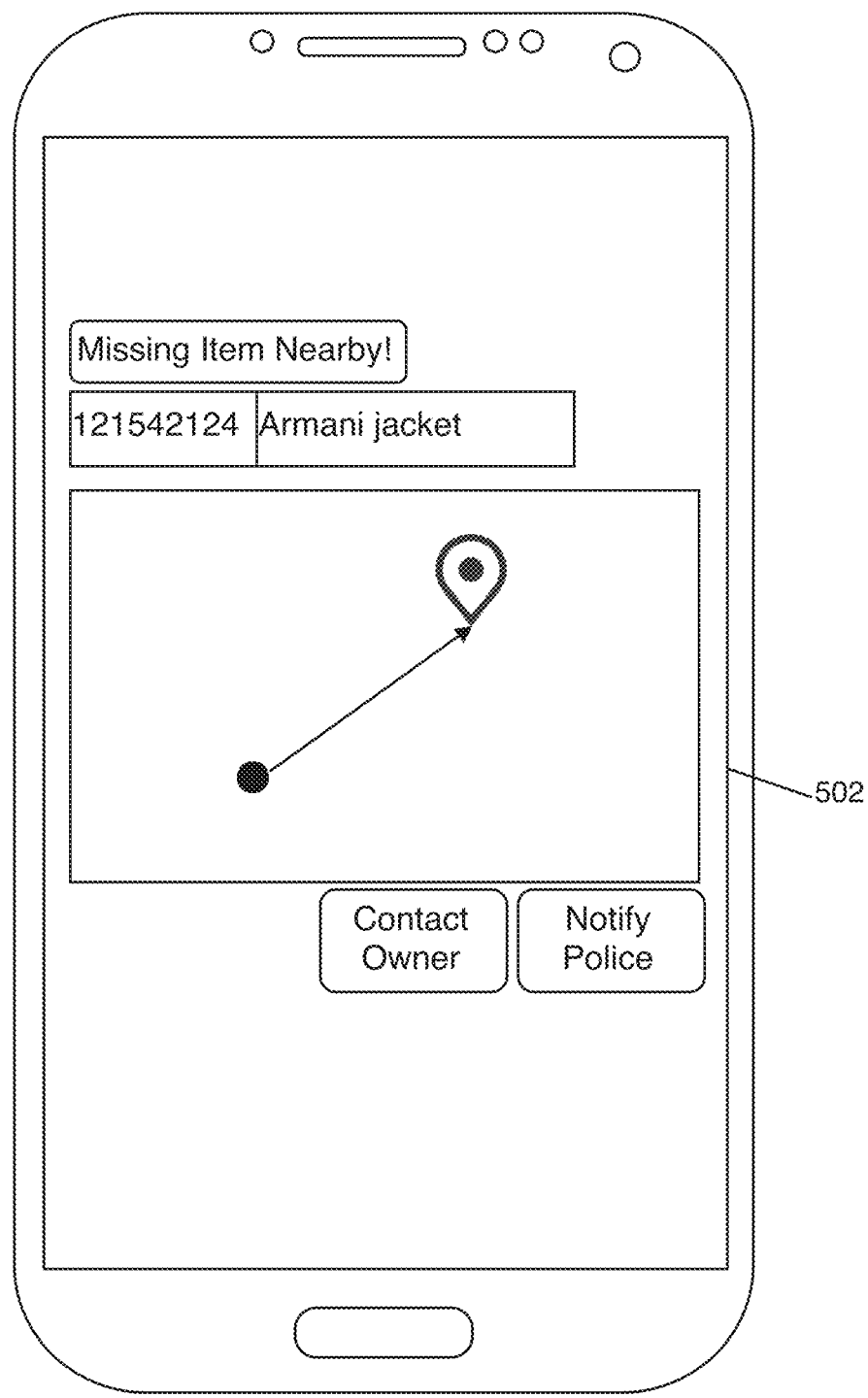
FIG. 5 is a front view of another user interface displayed on a display of a computing device of the system of FIG. 1.

FIG. 5 was previously described to some extent, it is represented as showing a user interface (UI) (interface) 502 which is displayed on the display of a device of a second user of the system (in other words a user who is not an owner of the item being located), through the app installed on the second user's device. The second user happens to be located somewhere nearby the missing item, and a notification is sent to the second user allows the user to arrive at this interface which displays "Missing Item Nearby!" along with the identifier (which may in implementations be hidden for privacy purposes), a description of the missing device (previously input in the system by the owner as described with respect to FIG. 4), a map and navigating directions (which may utilize a third party map application), an input to contact the owner associated with the lost item (which may be done through an in-app messaging function or through a third party application such as emailing or texting or calling the user using user identification information associated with the owner through the database), and an input to notify police, which may send a report or notification or message or call to law enforcement to notify them of the found missing item so that law enforcement may locate the item and return it to the owner and/or close out any case file for the missing item.

The app may also facilitate payments, such as by paying the finder a finder's fee, and/or paying postage for returning the item, and the methods described herein could include partnerships with reputable shippers so that the fee is paid directly by the owner to the shipper through the app, such as using inputs on interfaces not shown in the drawings, such that the finder incurs no direct fees in returning the item.

Figure 6:
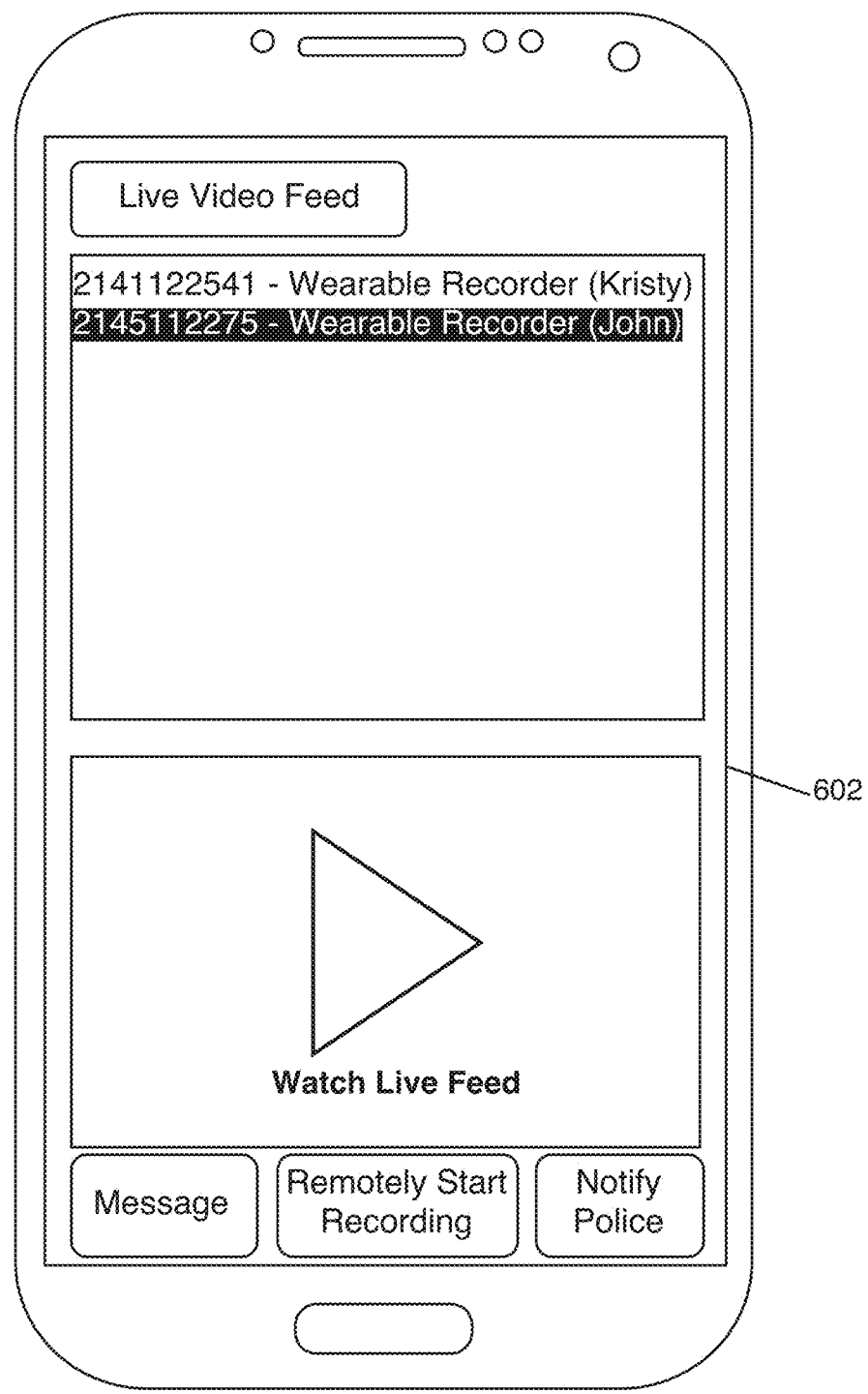
FIG. 6 is a front view of another user interface displayed on a display of a computing device of the system of FIG. 1.

FIG. 6 shows a representative example of a user interface (UI) (interface) 602 shown on a device of a friend or family member or trusted associate of a user who is wearing the wearable recording device. Interface 602 could also be shown on an interface of a device of a law enforcement officer. A "Live Video Feed" title is shown at the top of the screen, and towards the bottom of the screen a large play button is shown (along with "Watch Live Feed") which, if selected, begins displaying live video and playing live audio as captured by the wearable recording device that is being worn by the end user. Thus, the family member or friend etc. may check in on the person to see where they are at, what they are seeing, etc., to ensure they are safe, and so forth. In some implementations if the live feed play button is selected a password may be required to watch it, which may be given by the end user to trusted persons, and these passwords may be permanent or may be set to expire (for example giving law enforcement only the ability to record for a set time period). Below the "Live Video Feed" title a list of wearable recording devices is shown. As can be seen, this user has two wearable recording devices that he/she has been given access to, one of a friend or family member etc. named Kristy and another of a friend or family member etc. named John. The identifier of each wearable recording device is also shown, and the user may select either (the bottom one is shown selected here) and the live video feed may be selected to start playback. There are also inputs shown for sending a message to the end user (the wearer of the selected recording device), for remotely starting recording (which may also require a password given by the end user), and for contacting or sending a message to police, which may be done by in-app communications or through a separate application on the device such as text message, a phone call, an email, etc. Thus, the system associates, through the database, third party users and credentials (for viewing privileges) with the wearable recording device (and recorded data) of a first user or end user. Viewing privileges/credentials may be revoked as desired in some implementations.

In some implementations the tracker may have the identifier shown on both sides of the tracker. In implementations the adapter may be configured to directly physically and electrically couple the wearable recording device with a mobile phone (such as through the audio jack of the phone as is used for some credit card readers). In implementations the trackers are waterproof. The trackers in implementations are flexible enough to be easily bent to conform to some desired position without affecting tracking capabilities (so that it could be placed in shoes, belts, waistbands, etc. and be bent without affecting tracking). In implementations several varieties of earrings may be utilized (various designs) such as stud earrings with clear lenses that may or may not appear to be gemstones (in some implementations cubic zirconium may be used). In some implementations portions of the flexible trackers may be cut (such as to reduce the size or alter the shape of the tracker) without cutting the portion that includes the passive identification or active identification tag, so that the tracker may be custom tailored or custom sized and shaped to a specific use. In implementations various colors and color schemes (single solid color, camouflage, clear, etc.) may be used for trackers to further ensure they remain hidden. Trackers may be used in military and law enforcement settings to assist the location and rescue of wounded or captured military or police personnel. The system is useful to locate kidnapped persons, missing persons, or stolen items and may greatly reduce the cost associated with missing persons searching (for example a few drones may comb over a suspected area without the use of any audio/video capturing and simply send out signals to receive a signal from a tracker and notify to then send a live person to that location). In implementations trackers may be glued to items to be tracked without affecting performance of the tracker. In implementations the trackers may be worn like bracelets or as hair ornaments (or may be incorporated into bracelets or hair ornaments). Trackers may be useful for hospitals with dementia patients, parents tracking children, prison systems tracking escaped prisoners, and the like. The system also improves pushes evidence gathering in favor of the victim of an actual crime in instances where police may not be able to easily obtain evidence from a criminal due to the need to obtain a search warrant prior to searching a person or premises, as the victim may have recorded proof of the crime or stolen item, which may reduce unnecessarily lenient sentencing (or no conviction) due to a lack of evidence. The system may be useful for stopping and/or prosecuting trophy criminals (criminals who take stolen items from victims as trophies) and stopping future, similar offenses.

In some implementations a family member or friend or trusted person, or a law enforcement party, could utilize the tracker to only locate the location of the end user, without necessarily seeing the recorded or streamed audio/video. The end user could for instance give a third party permission, such as through a password to be used through the software app, to only keep track of their location via the tracker, and not to view audio/video, for security but also to maintain some privacy. The end user could indicate to the third party ahead of time where they expect to be so that law enforcement could be notified, or a call to the end user made, if they appear to be in a location that was not expected.

In implementations the system may be configured to allow downloading of data from the wearable recording device through an adapter to a memory stick such as a flash drive. In some implementations, as described herein, data is stored in memory of the wearable recording device. In other implementations the wearable recording device could stream the data to the linked mobile phone or device and not store the data in memory of the wearable device (or the wearable device may exclude memory elements). In implementations the wearable recording device may be coupled or attached with a nearby power source or signal generator/receiver, such as easily-hidden hearing aid devices that are often hidden behind ears, or the like, to extend the recording time or quality of the recording and transmission to the nearby linked device. In some implementations the tracker and/or earring or wearable recording devices each has a power source (such as a rechargeable battery source or other power element) and each includes GPS positioning functionality.

Although specific examples of user interfaces are given, described with touch selectors for some inputs, the practitioner of ordinary skill could make changes to the specific inputs (including changing selection types from a touch to a slide or a double tap or a long press or audio input or the like), changing some wording, changing positions of selectors and relative positions of various interface elements, using more or fewer user interfaces (consolidating some elements into the same interface screens), and the like without departing from the scope of the system as described herein.

In places where the description above refers to specific embodiments of security and tracking systems and related methods, one or more or many modifications may be made without departing from the spirit and scope thereof. Details of any specific embodiment/implementation described herein may, wherever possible, be applied to any other specific implementation/embodiment described herein.

What is claimed is:
1. A security and tracking system (system), comprising:
a server communicatively coupled with a database;
a computing device communicatively coupled with the database through a telecommunication network, the computing device comprising a display;
a tracking device (tracker), the tracker configured to be insertable into one of a hem and a fold of a clothing item, the tracker having a tracker identifier associated with a user through the database;
a wearable recording device configured to record audio and video, the wearable recording device having a wearable recording device identifier associated with the user through the database, and;
one or more user interfaces displayed on the display, the one or more user interfaces comprising one or more inputs configured to associate the tracker identifier with the user through the database and to associate the wearable recording device identifier with the user through the database.

2. The system of claim 1, wherein the tracker comprises a passive identification tag.

3. The system of claim 1, wherein the wearable recording device comprises a power switch.

4. The system of claim 1, wherein the wearable recording device comprises an electrical connector configured to transfer recorded audio and video to a second computing device.

5. The system of claim 1, wherein the wearable recording device comprises an earring.

6. The system of claim 1, wherein the tracker comprises a visual display of the tracker identifier.

7. The system of claim 1, further comprising an adapter comprising a first electrical connector configured to physically and electrically couple with an electrical connector of the wearable recording device, the adapter also comprising a second electrical connector configured to physically and electrically couple with a second computing device to allow downloading of recorded audio and video from the wearable recording device to the second computing device.

8. The system of claim 1, wherein the tracker identifier and the wearable recording device identifier are identical.

* * * * *

UNITED STATES PATENT AND TRADEMARK OFFICE
CERTIFICATE OF CORRECTION

| | | |
|---|---|---|
| PATENT NO. | : 10,176,693 B2 | Page 1 of 1 |
| APPLICATION NO. | : 15/845078 | |
| DATED | : January 8, 2019 | |
| INVENTOR(S) | : Leola Brantley | |

It is certified that error appears in the above-identified patent and that said Letters Patent is hereby corrected as shown below:

In the Specification

Column 7, Line 51, the text "tacker 116" should read -tracker 116-.

Column 10, Lines 23-24, the text "notification is sent" should read -notification which is sent-.

Column 11, Line 57, delete the word "pushes".

Signed and Sealed this
Nineteenth Day of February, 2019

Andrei Iancu
*Director of the United States Patent and Trademark Office*